United States Patent

Sameshima et al.

Patent Number: 5,079,907
Date of Patent: Jan. 14, 1992

[54] LAWN MOWER HAVING A TILTABLE BLADE HOUSING

[75] Inventors: Kazuo Sameshima; Hiroaki Kawakita; Shigeru Morita; Yoshikazu Togoshi; Yoshihiro Kawahara, all of Osaka, Japan

[73] Assignee: Kubota Corporation, Osaka, Japan

[21] Appl. No.: 581,860

[22] Filed: Sep. 13, 1990

[30] Foreign Application Priority Data

Sep. 26, 1989 [JP] Japan ............................ 1-250327
Jan. 29, 1990 [JP] Japan ............................ 2-20274

[51] Int. Cl.⁵ ...................... A01D 34/66; A01D 34/24
[52] U.S. Cl. ............................... 56/15.9; 56/DIG. 22
[58] Field of Search .............. 56/15.8, 15.9, 6, 13.6, 56/16.2, 16.3, DIG. 22; 172/457, 456; 280/481, 481.3, 43.17, 43.23

[56] References Cited

U.S. PATENT DOCUMENTS

| | | | |
|---|---|---|---|
| 4,429,515 | 2/1984 | Davis, Jr. et al. | 56/DIG. 22 X |
| 4,563,019 | 1/1986 | Kuhn et al. | 56/15.9 X |
| 4,650,206 | 3/1987 | Mathis | 172/457 X |
| 4,779,406 | 10/1988 | Schroeder | 56/15.9 |

FOREIGN PATENT DOCUMENTS

| | | | |
|---|---|---|---|
| 1021463 | 12/1952 | France | 56/15.9 |
| 63-98010 | 6/1988 | Japan . | |
| 63-226202 | 9/1988 | Japan . | |

Primary Examiner—David J. Bagnell
Attorney, Agent, or Firm—Jordan and Hamburg

[57] ABSTRACT

A riding lawn mower comprises a grass cutting unit and a blade housing movable between a substantially horizontal mowing position and an upturned servicing position. The blade housing is suspended by a raising and lowering link mechanism having one end connected to the blade housing and the other end connected to a vehicle body. The blade housing, when raised, is pivotable backward about a connection thereof to the raising and lowering link mechanism, to expose cutting blades mounted therein. This servicing position is maintained by a prop link pivotally connected to one end to the raising and lowering link mechanism, and connectable at the other end to a bracket formed on the housing.

8 Claims, 6 Drawing Sheets

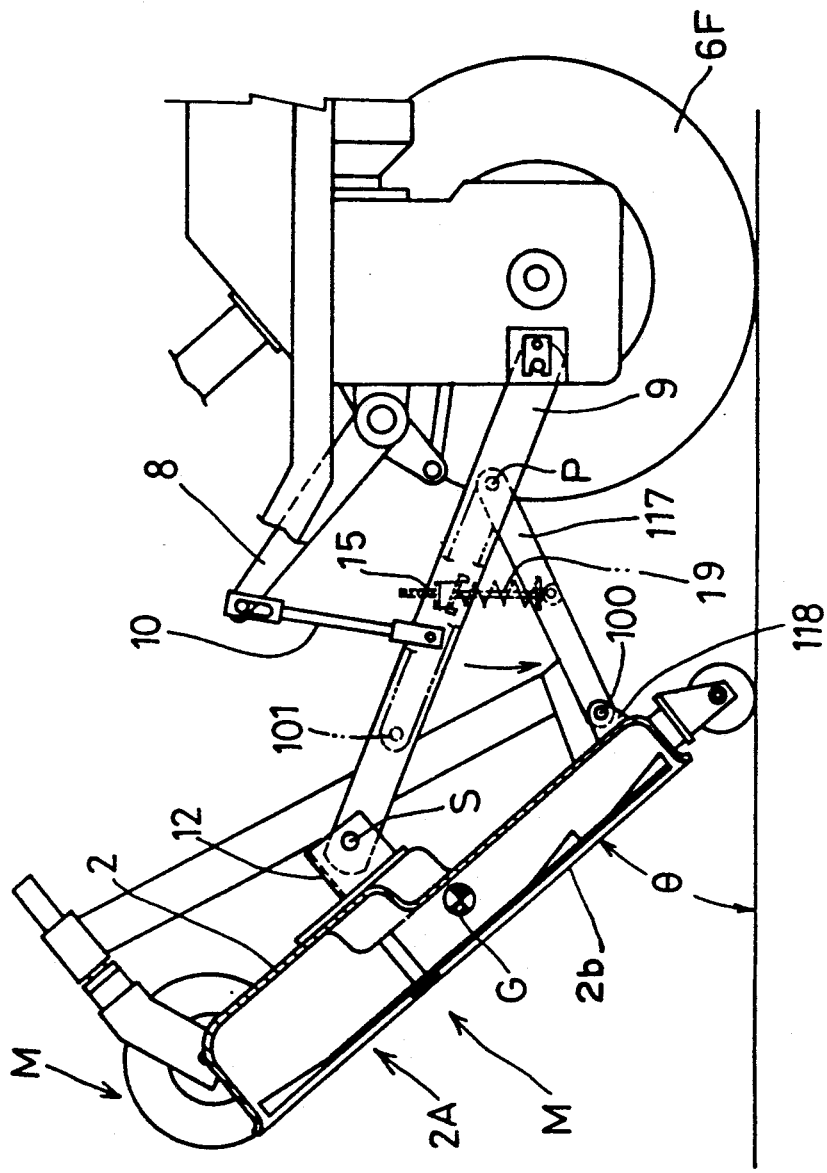

LAWN MOWER HAVING A TILTABLE BLADE HOUSING

BACKGROUND OF THE INVENTION

(1) Field of the Invention

The present invention relates to a lawn mower with a structure for vertically movably suspending a blade housing from a vehicle body through a raising and lowering link mechanism and allowing the blade housing to tilt relative to the vehicle body.

(2) Description of the Prior Art

Examples of lawn mowers as noted above are disclosed in Applicant's prior Japanese utility model application published as Kokai No. 63-98010 and patent application published as Kokai No. 63-226202. These lawn mowers have a grass cutting unit suspended from lift arms through suspender links, the cutting unit being vertically movable by raising and lowering the lift arms.

The interior of a blade housing and cutting blades therein are inspected, serviced and cleaned periodically. For this purpose, the cutting unit is raised to an upper limit to expose the bottom of the blade housing.

However, with the prior structures disclosed in the above publications, because the cutting unit is suspended at both front and rear ends thereof by the suspender links, the cutting unit cannot be raised to an extent to expose the housing bottom sufficiently although, seen as a whole, the front end is raised higher than the rear end. Such a limitation renders inspection, servicing and other maintenance operations difficult or practically impossible.

Under such circumstances, the lawn mower is parked, for example, at a height on a terrain having different levels, with the cutting unit at the front of the mower extending over a lower tract. In this state, the operator in an upward facing posture on the lower tractor carries out a maintenance operation for the interior of the blade housing. Such a practice has the inconveniences that the maintenance operation can be carried out only at limited locations, that the upwardly facing posture maintained constantly tends to tire the operator, and that the operation itself is not efficient.

SUMMARY OF THE INVENTION

An object of the present invention is to provide a lawn mower for allowing a maintenance operation to be carried out on an ordinary terrain with ease and without using a special configuration of the ground.

In order to fulfill the above object, a lawn mower according to the present invention has a blade housing assembly tiltably connected to a vehicle body and comprising a blade housing placed in a substantially horizontal mowing position, cutting blades rotatably mounted in the blade housing, a raising and lowering link mechanism having one end connected to the blade housing and the other end connected to the vehicle body for vertically movably suspending the blade housing, a pivotal axis for pivotally interconnecting the blade housing and the raising and lowering link mechanism, the blade housing being pivotable about the pivotal axis to a servicing position when raised by the raising and lowering link mechanism, and a prop link having one end thereof pivotally connected through a swing axis to the raising and lowering link mechanism, and the other end connectable to a connector formed on the blade housing when the blade housing is caused to pivot to the servicing position, whereby the blade housing is maintained in the servicing position.

With this construction, the rear end of the blade housing may be dropped to a great extent by lifting the raising and lowering link mechanism to an upper limit and connecting the other end of the prop link as suspended to the connector formed on the blade housing. Then the upturned blade housing has a bottom thereof exposed forwardly in a wide open state.

Thus, the construction according to the present invention has the following functions:

(a) This construction allows the operator to change the cutting blades in addition to maintenance of the housing interior and cutting blades while facing horizontally on the same terrain on which the vehicle body is placed.

(b) Since the grass cutting unit is fixed in position by the raising and lowering link mechanism and prop link, the maintenance operation is facilitated in the absence of wobbling of the blade housing.

(c) The prop link, when out of use, is contained in a position extending along the raising and lowering link mechanism. Thus, the prop link may be carried by the lawn mower at all times without presenting obstruction.

The present invention provides the following advantages:

The function (a) above enables maintenance of the housing interior and cutting blades to be carried out with ease on an ordinary terrain. The function (b) facilitates the maintenance operation, and promotes its efficiency.

The function (c) eliminates the inconvenience of carrying the prop link in a separate position and the possibility of forgetting to carry the prop link. The addition of the prop link does not result in a new problem.

In a preferred embodiment of the present invention, the blade housing is supported as offset relative to the vehicle body in an opposite direction to a grass outlet. For this purpose, a raising and lowering link lying on the side to which the housing is offset is curved in the direction of offset. The prop link has one end pivoted to a curved portion of this raising and lowering link. The prop link as suspended has the other end connectable to and disconnectable from the blade housing. The prop link is movable and fixable to a contained position along the raising and lowering link.

Since, in this embodiment, the prop link is provided on the portion of the raising and lowering link curved in the direction in which the blade housing is offset, the operator has easy access to the prop link from outwardly of the vehicle body.

Other features and advantages of the present invention will be apparent from the following description.

BRIEF DESCRIPTION OF THE DRAWINGS

The drawings show a tiltable blade housing assembly for a lawn mower according to the present invention, in which:

FIG. 8 is a side view, partly broken away, of a blade housing in an upturned position, of the lawn mower shown in FIG. 7.

DESCRIPTION OF THE PREFERRED EMBODIMENTS

An embodiment of the present invention will be described hereinafter with reference to the drawings.

Figure 1:
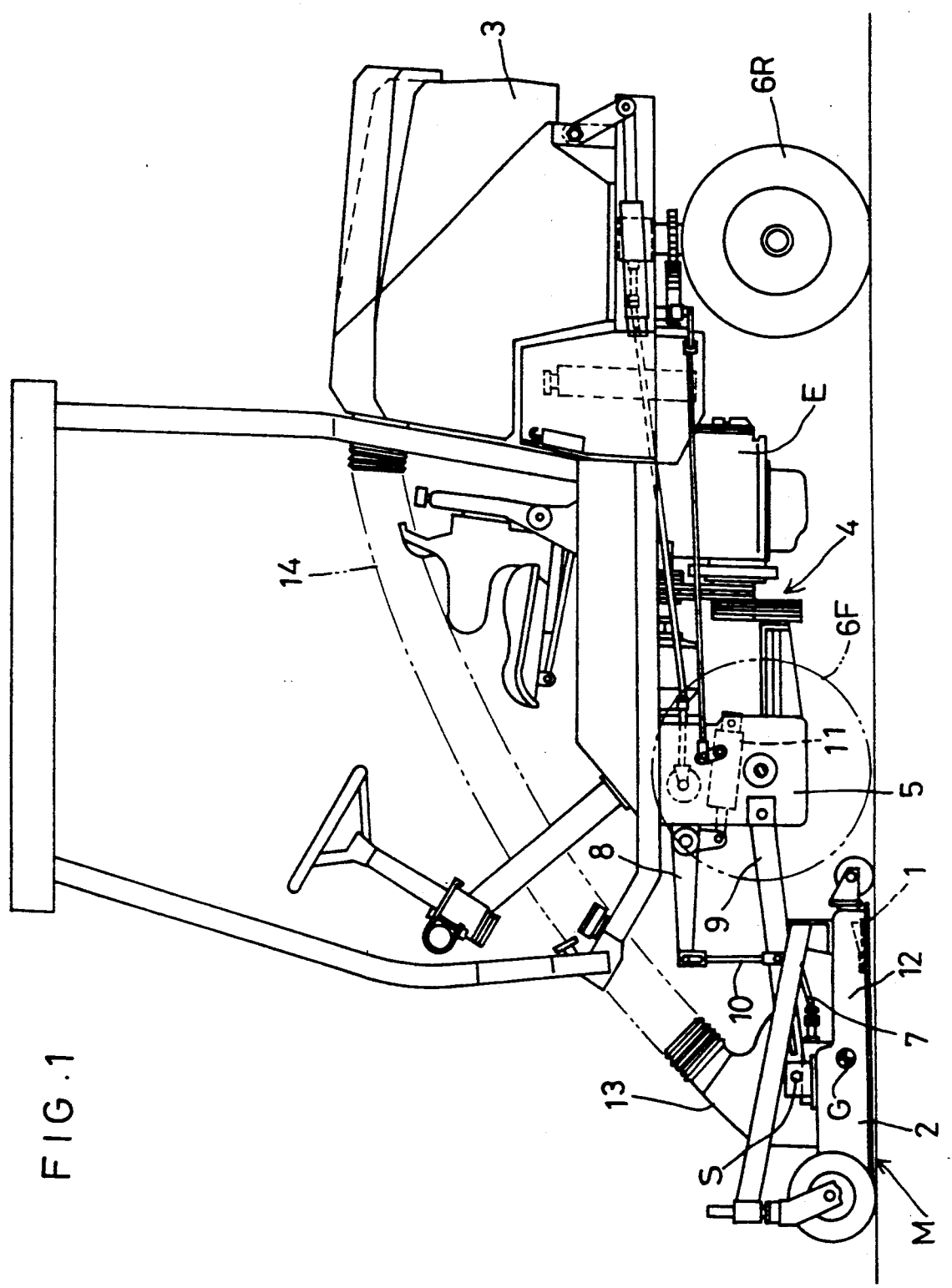
FIG. 1 is a side elevation of the lawn mower.

FIG. 1 shows a riding type lawn mower which comprises a mowing or grass cutting unit M vertically swingably connected to a front end of a vehicle body. The mowing unit M includes three cutting blades 1 rotatable about vertical axes in a housing 2. The vehicle body carries a grass catcher 3 mounted at a rear end thereof for collect grass clippings.

The vehicle body further carries an engine E, and power of the engine E is transmitted through a transmission belt mechanism 4 to a front transmission 5 and a rear transmission (not shown) for driving front wheels 6F and rear wheels 6R. The power of the engine E is transmitted also to the blade housing 2 through a flexible transmission shaft mechanism 7 including a universal joint 7a and a transmission shaft 7b arranged longitudinally of the vehicle body, for driving the three cutting blades 1.

Figure 5:
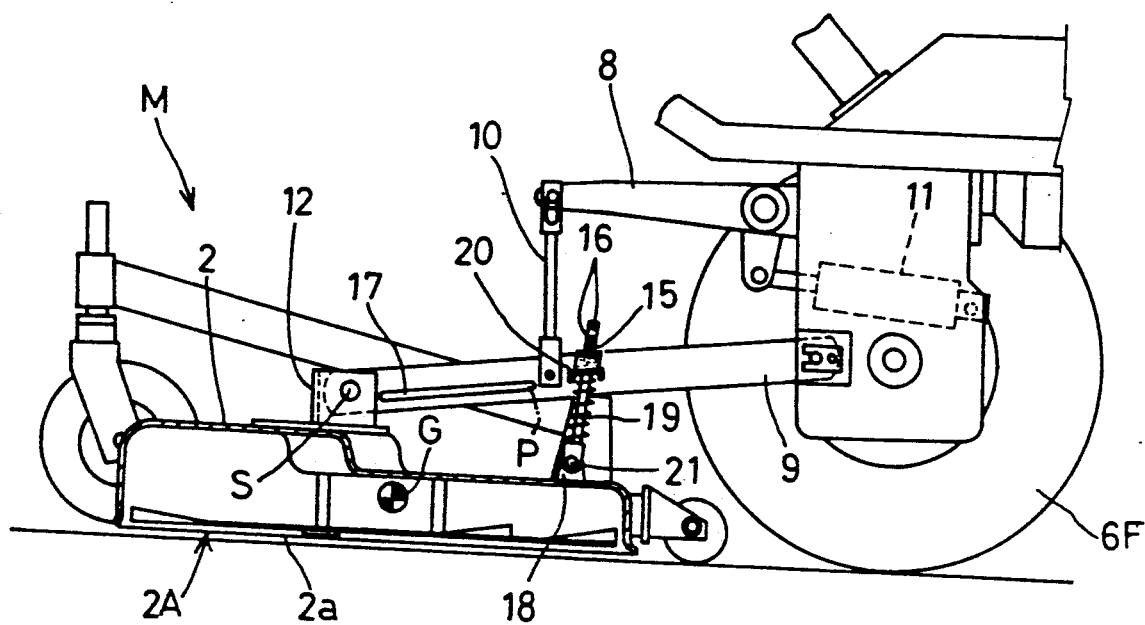
FIG. 5 is a side view, partly broken away, of a blade housing in a mowing position.

A construction for vertically swinging the blade housing 2 will be described with reference to FIGS. 2 and 5. This construction includes a pair of right and left lift arms 8 and a pair of right and left raising and lowering links 9 connected to the vehicle body for pivotal movement about transverse axes. The lift arms 8 are connected to the raising and lowering links 9 through lift rods 10, respectively, and a cylinder 11 is provided for vertically driving the lift arms 8.

Each of the raising and lowering links 9 is connected at a forward end thereof to a bracket 12 secured to a top position of the blade housing 2. Further, each raising and lowering link 9 is connected at an intermediate position thereof to the housing through an adjusting rod 19. The housing 2 is thus vertically movable by the cylinder 11.

The adjusting rod 19 and raising and lowering link 9 are interconnected by a pin 15. By vertically shifting this pin connection, fine adjustment may be made to an angle of the mowing unit M relative to the raising and lowering links 9.

Figure 2:
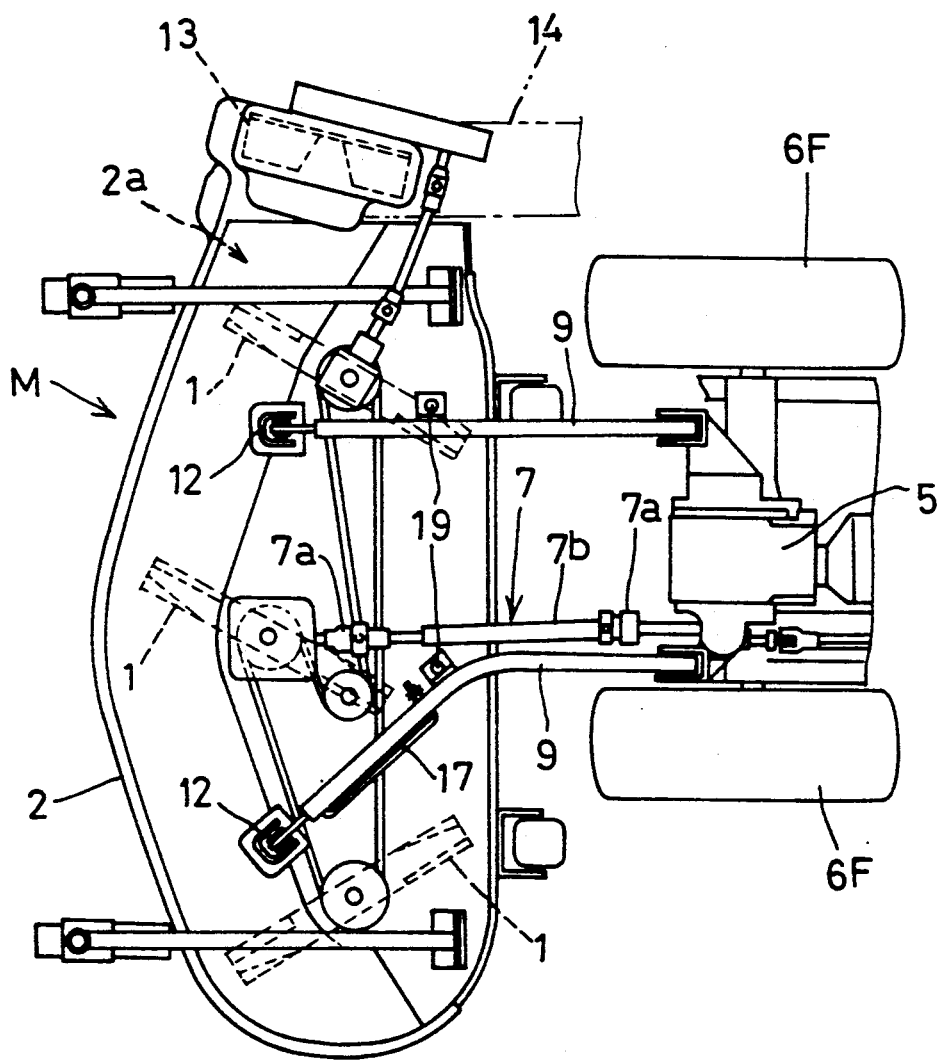
FIG. 2 is a plan view of a front portion of the lawn mower.

As shown in FIG. 2, grass clippings cut by the three cutting blades 1 are transferred rightward to a grass outlet 2a, and are then delivered by a blower 13 through a duct 14 to the grass catcher 3.

The blade housing 2 is offset leftward of the vehicle body, i.e. in the opposite direction to the grass outlet 2a. This construction enables the lawn mower to make a left turn while continuing a mowing operation, leaving only a small patch uncut.

Figure 4:
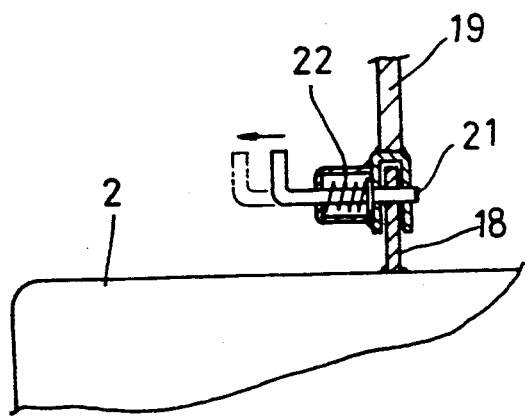
FIG. 4 is a rear view of a connection at a lower end of an adjusting rod.

The way in which the housing 2 is pivoted to the raising and lowering links 9 will be described in detail next. As shown in FIGS. 4 and 5, the bracket 12 is fixed to the top position of the housing 2 so that a pivotal connection S of the housing 2 to each raising and lowering link 9 is located slightly forwardly of the center of gravity G of the housing 2. Each of the adjusting rods 19 is pivotally connected through a bracket 18 to a top position of the housing 2 rearwardly of the bracket 12, and extends through a bracket 20 attached to each raising and lowering link 9. The adjusting rod 19 defines a plurality of bores 16 arranged vertically, and the pin 15 is inserted into one of the bores 16. The adjusting rod 19 is pivoted at a lower end thereof to the bracket 18 by a connecting pin 21. As shown in FIG. 5, the connecting pin 21 is provided as part of the adjusting rod 19 and urged to a connecting position by a spring 22. The lower end of the adjusting rod 19 may readily be freed from the bracket 18 by pulling out the pin 21.

The locations of the pivotal connections S are selected slightly forwardly of the center of gravity G of the housing 2 in order to allow the housing 2 to swing about the pivotal connections S with ease and to prevent the rear end of the housing 2 from rapidly falling by gravity when the connecting pins 21 are pulled out to break the connection between the adjusting rods 19 and brackets 18 to expose the bottom of the housing 2 forwardly. Where these aspects do not require care, the pivotal connections S may be located at other positions.

As shown in FIGS. 2 the left raising and lowering link 9 is curved leftward to support the mowing unit M as offset leftward. A prop link 17 has a rear end inserted from an outward side through an intermediate position of the left raising and lowering link 9 to be vertically pivotable about a transverse axis P. The prop link 17 has a forward end 17a connectable to and disconnectable from the bracket 18 from which the lower end of the adjusting rod 19 has been removed. The prop link 17 is pivotable about the axis P and fixable to a contained position along the forward half of the left raising and lowering link 9.

Figure 3:
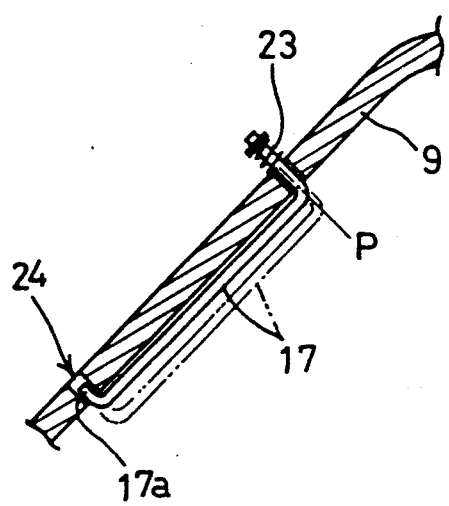
FIG. 3 is a plan view of a prop link support structure.

As shown in FIG. 3, a spring 23 is mounted on the rear end of the prop link 17 for drawing the link 17 to an outward side face of the raising and lowering link 9. The forward end 17a of the prop link 9 is insertible to a bore 24 defined in the raising and lowering link 9 whereby the prop link 17 is maintained in the contained position.

Figure 6:
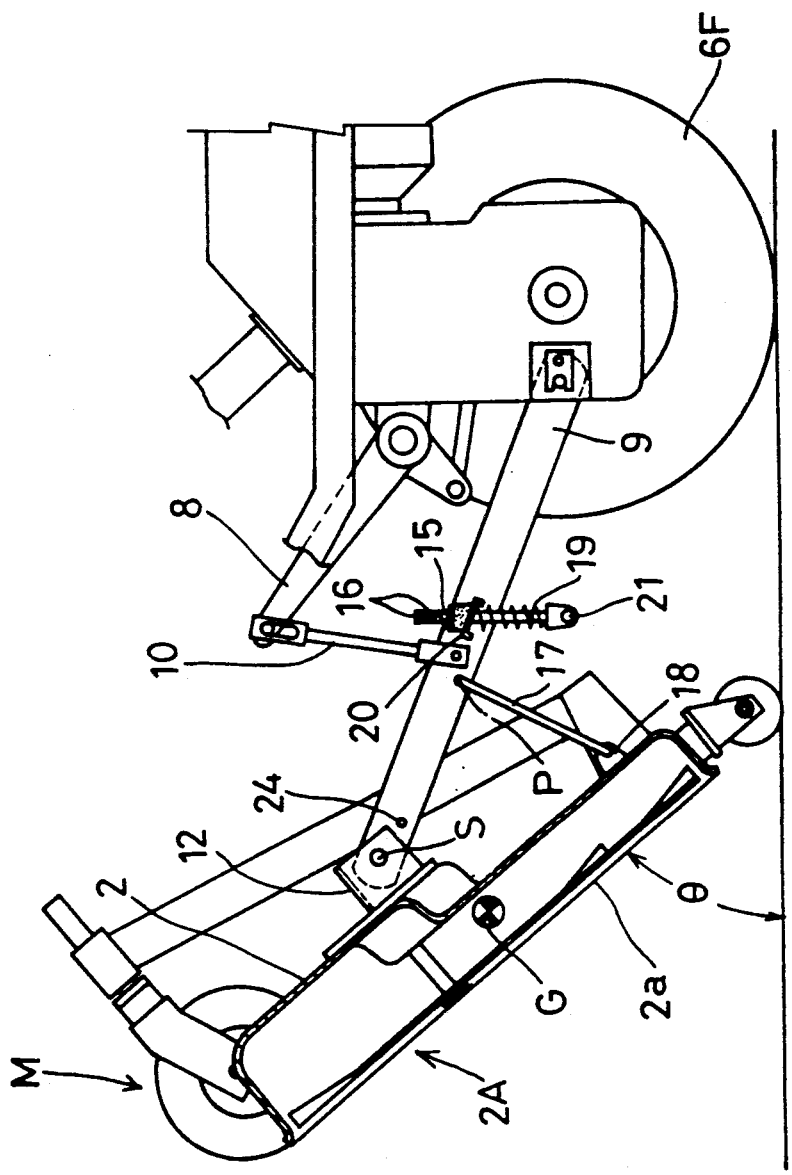
FIG. 6 is a side view, partly broken away, of the blade housing in an upturned position.

For a maintenance operation, the raising and lowering links 9 are lifted to an upper limit, and the lower ends of the adjusting rods 19 are removed from the raising and lowering links 9. The forward end 17a of the prop link 17 is pulled out of the bore 24 of the left raising and lowering link 9. The prop link 17 is swung about the axis P at the rear end downwardly from the contained position, and the forward end 17a is inserted through the bracket 18 on the housing 2. Then the housing 2 takes an approximately upright posture as shown in FIG. 6, with the bottom of the housing 2 exposed forwardly. This position allows a maintenance operation such as cleaning or inspection and servicing of the housing interior or change of the cutting blades to be carried out with ease.

The transmission shaft mechanism has a sufficient amount of flexion at the joint so that this mechanism need not be dismounted for allowing the maintenance operation to be carried out with the blade housing upturned.

During a normal grass cutting operation, the prop link 17 is fixed to the contained position along the left raising and lowering link 9.

Figure 7:
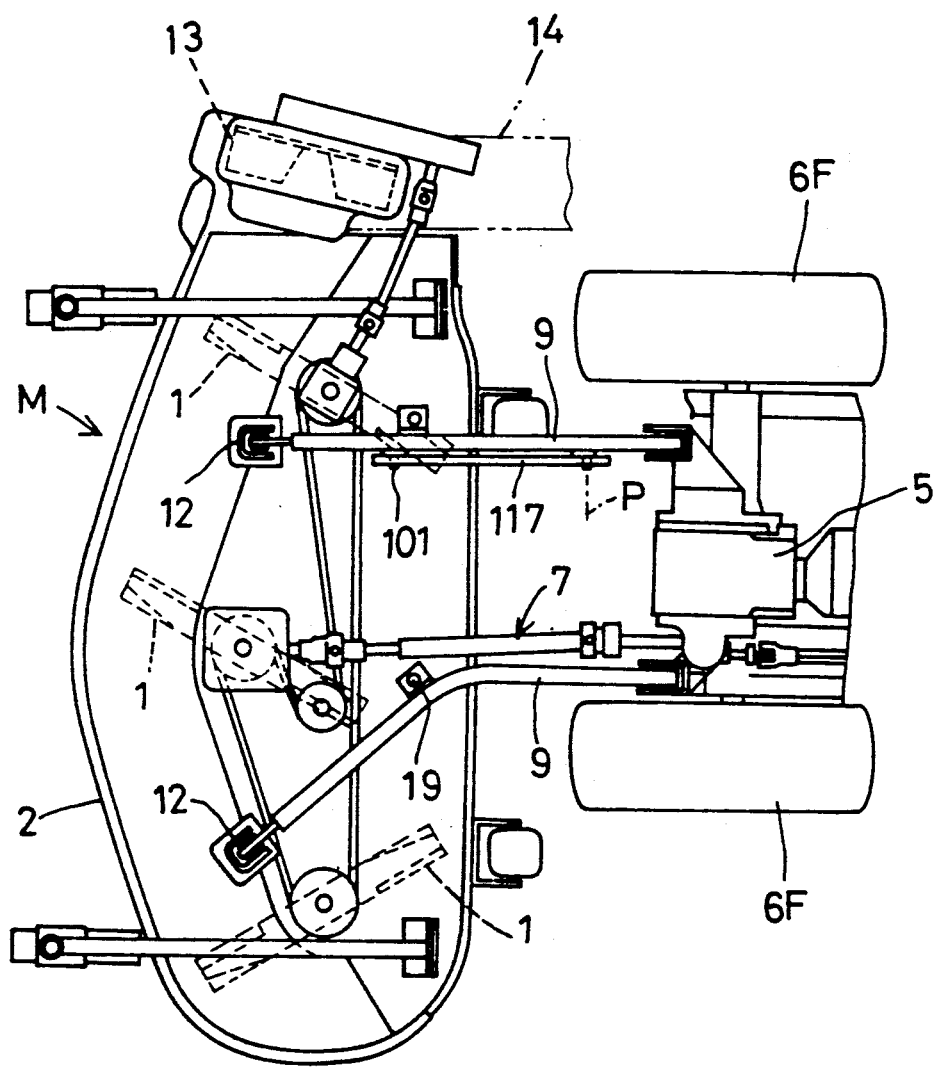
FIG. 7 is a plan view of a front portion of a lawn mower in a different embodiment.

FIGS. 7 and 8 show a modified lawn mower which differs from the foregoing embodiment in the shape and attaching position of the prop link.

As shown, a prop link 117 is connected at one end thereof, to be pivotable about a transverse axis P, to a rear inward position of the right raising and lowering link 9 formed straight. The prop link 117 has the other end connectable to and disconnectable from a bracket 118 provided on the blade housing 2. The prop link 17 is pivotable about the axis P and fixable to a contained position along the raising and lowering link 9.

The bracket 118 includes a transverse pin 100 while the prop link 117 defines a bore at the other end for receiving the transverse pin 100. The right raising and lowering link 9 includes a fixing pin 101 similar to the transverse pin 100 and projecting sideways from a position forwardly of the axis P. Thus the other end of the prop link 117 is selectively engageable with the bracket 110 on the housing and with the fixing pin 101 on the right raising and lowering link 9.

For a maintenance operation, the raising and lowering links 9 are lifted to the upper limit, and the lower ends of the adjusting rods 19 are removed from the raising and lowering links 9. The forward end of the prop link 117 is pulled out of engagement with the fixing pin 101. The prop link 117 is swung about the axis P at the rear end downwardly from the contained position, and the forward end is connected to the bracket 118 on the housing 2. Then the housing 2 takes an approximately upright posture as shown in FIG. 8, with the bottom 2A of the housing 2 exposed forwardly as in the foregoing embodiment. This position allows a maintenance operation such as cleaning or inspection and servicing of the housing interior or change of the cutting blades to be carried out with ease.

Where the bottom edge 2b of the housing 2 in the upturned posture forms an acute angle O, preferably 60 to 90 degrees, with the ground, safety is assured with no possibility of the mowing unit M turning over rearwardly, and at the same time the bottom 2A of the housing 2 is sufficiently exposed for a maintenance operation. The above angle may be set to a value exceeding 90 degrees provided that the construction is so devised as to prevent the housing 2 from turning over further rearwardly.

During a normal grass cutting operation, the prop link 117 is fixed to the contained position along the right raising and lowering link 9.

In the described embodiments, the blade housing 2 is vertically movable by what is known as a two-point link mechanism. However, the specific construction for raising and lowering the housing 2 is variable as desired, such as by employing a single raising and lowering link (or lift arm).

What is claimed is:

1. A blade housing assembly tiltably connected to a vehicle body comprising;
   a blade housing placed in a substantially horizontal mowing position,
   cutting blades rotatably mounted in said blade housing,
   raising and lowering link means having one end connected to said blade housing and the other end connected to said vehicle body for vertically movably suspending said blade housing,
   pivotal axis means for pivotally interconnecting said blade housing and said raising and lowering link means, said blade housing being pivotable about said pivotal axis means to a servicing position when raised by said raising and lowering link means, and
   prop link means having one end thereof pivotally connected through a swing axis to said raising and lowering link means, and the other end connectable to a connector formed on said blade housing when said blade housing is caused to pivot to said servicing position, whereby said blade housing is maintained in said servicing position.

2. A blade housing assembly as claimed in claim 1, further comprising adjusting means having one end connected to said raising and lowering link means and the other end connected to said blade housing for adjusting posture of said blade housing, said adjusting means being disconnected when said blade housing is caused to pivot to said servicing position.

3. A blade housing assembly as claimed in claim 2, wherein said adjusting means includes:
   a first mounting bracket provided on said blade housing,
   a second mounting bracket provided on said raising and lowering link means and defining a perforation,
   an adjusting rod having one end connected to said blade housing and the other end extending through said perforation, said adjusting rod defining a plurality of adjusting bores arranged axially thereof,
   an adjusting pin insertible into said adjusting bores, and
   resilient means disposed between said adjusting pin and said second mounting bracket.

4. A blade housing assembly as claimed in claim 1, wherein said raising and lowering link means includes a first raising and lowering link and a second raising and lowering link spaced from each other transversely of a running direction of said vehicle body, said second raising and lowering link including a straight link portion adjacent said vehicle body, and a curved link portion adjacent said blade housing which is curved laterally outwardly, said first and second raising and lowering links being connected to said blade housing through ball joints.

5. A blade housing assembly as claimed in claim 4, wherein said prop link means is connected to said first raising and lowering link.

6. A blade housing assembly as claimed in claim 4, wherein said prop link means is connected to said curved link portion of said second raising and lowering link.

7. A blade housing assembly as claimed in claim 1, wherein said cutting blades are exposed to access when said blade housing is in said servicing position.

8. A blade housing assembly as claimed in claim 1, wherein said raising and lowering link means has a two-point link structure including raising and lowering links, lift arms connected to a hydraulic cylinder, and lift rods interconnecting said raising and lowering links and said lift arms respectively.

* * * * *